United States Patent
Jerger

(10) Patent No.: US 10,941,723 B2
(45) Date of Patent: Mar. 9, 2021

(54) CONTROLLER FOR CONTROLLING AN ENGINE OF A VEHICLE

(71) Applicant: JAGUAR LAND ROVER LIMITED, Warwickshire (GB)

(72) Inventor: Rob Jerger, Whitley (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 16/327,899

(22) PCT Filed: Sep. 6, 2017

(86) PCT No.: PCT/EP2017/072375
§ 371 (c)(1),
(2) Date: Feb. 25, 2019

(87) PCT Pub. No.: WO2018/046553
PCT Pub. Date: Mar. 15, 2018

(65) Prior Publication Data
US 2019/0195155 A1 Jun. 27, 2019

(30) Foreign Application Priority Data
Sep. 7, 2016 (GB) .................................. 1615165.6

(51) Int. Cl.
*B60W 10/02* (2006.01)
*B60W 10/06* (2006.01)
(Continued)

(52) U.S. Cl.
CPC ............ *F02D 41/022* (2013.01); *B60K 6/485* (2013.01); *B60W 10/06* (2013.01);
(Continued)

(58) Field of Classification Search
CPC .... B60W 10/02; B60W 10/06; B60W 30/192; B60W 2510/104; B60W 2710/0644; B60W 2710/065; F02D 41/022; F02D 2200/101
See application file for complete search history.

(56) References Cited

U.S. PATENT DOCUMENTS

| 2004/0138027 A1 | 7/2004 | Rustige et al. |
| 2006/0081207 A1* | 4/2006 | Nakamura ............ F02N 99/006 123/179.3 |

(Continued)

FOREIGN PATENT DOCUMENTS

| FR | 2958613 A1 | 10/2011 |
| GB | 2492066 A | 12/2012 |

OTHER PUBLICATIONS

Combined Search and Examination Report under Sections 17 and 18(3) for Application No. GB1615165.6 dated Feb. 15, 2017.
(Continued)

*Primary Examiner* — Edwin A Young
(74) *Attorney, Agent, or Firm* — Carlson, Gaskey & Olds

(57) ABSTRACT

A controller (125) for controlling an engine (102) of a vehicle (103) is disclosed, along with a control system (101) comprising a controller (125), a vehicle (103) and a method (200, 500). The controller (125) comprises control means configured to cause stopping of power generation of the engine (102) during movement of the vehicle (103) in dependence on at least one criterion being met and to cause restarting of power generation by the engine (102), in dependence of at least one input signal indicating a requirement for the engine (102) to restart to provide a required power output. The control means is also configured to receive a target engine speed value dependent on a current driveshaft speed and cause the engine (102) to maintain a speed that is no greater than a target engine speed, dependent
(Continued)

on the target engine speed value, during a period after receiving the at least one input signal and until a further signal is received indicating that a reconnection of the engine (102) to a driveshaft (104) has been established. The control means is arranged to allow engine speed to exceed the target engine speed after receiving the further signal.

19 Claims, 11 Drawing Sheets

(51) Int. Cl.
      *F02D 41/02*     (2006.01)
      *F02N 11/08*     (2006.01)
      *B60K 6/485*     (2007.10)
      *B60W 30/18*     (2012.01)

(52) U.S. Cl.
    CPC . *F02N 11/0814* (2013.01); *B60W 2030/1809* (2013.01); *F02D 2200/101* (2013.01); *F02D 2200/602* (2013.01)

(56) References Cited

U.S. PATENT DOCUMENTS

| | | | |
|---|---|---|---|
| 2014/0136040 A1* | 5/2014 | Scholz | B60K 6/48 |
| | | | 701/22 |
| 2014/0144408 A1 | 5/2014 | Pursifull et al. | |
| 2014/0329633 A1* | 11/2014 | Borntraeger | F16H 47/02 |
| | | | 475/207 |
| 2015/0119196 A1 | 4/2015 | Schiergl | |
| 2015/0266480 A1 | 9/2015 | Kuroki et al. | |
| 2016/0115932 A1 | 4/2016 | Shafto et al. | |

OTHER PUBLICATIONS

International Search Report and Written Opinion of the International Searching Authority for International application No. PCT/EP2017/072375 dated Dec. 6, 2017.

* cited by examiner

CONTROLLER FOR CONTROLLING AN ENGINE OF A VEHICLE

TECHNICAL FIELD

The present disclosure relates to a controller for controlling an engine of a vehicle. In particular, but not exclusively it relates to a controller for controlling an engine of a car.

Aspects of the invention relate to a controller, a control system, a vehicle and a method.

BACKGROUND

To improve fuel consumption and reduce emissions, vehicles have recently been provided with systems that open the driveline and switch off the engine while the vehicle is moving, when the driver has either no, or very low, throttle pedal demands. When the driver requests an engine restart by pressing the accelerator, or when a system induced restart occurs (for example, in response to a request for the engine to restart for battery recharging or HVAC (heating, ventilation and air-conditioning)) sometimes the transmission fails to engage as the slip across the engaging clutch becomes too great. This may occur when a second torque request is received by the engine control system while the transmission is trying to close the clutch or because the engine speed is rising too quickly for the transmission to catch the on-going clutch and engage it fully.

It is an aim of the present invention to address this problem of the transmission failing to engage.

SUMMARY OF THE INVENTION

Aspects and embodiments of the invention provide a controller, a control system, a vehicle and a method as claimed in the appended claims.

According to an aspect of the invention there is provided a controller for controlling an engine of a vehicle, the controller comprising control means configured to: cause stopping of power generation of the engine during movement of the vehicle in dependence on at least one criterion being met; cause restarting of power generation by the engine, in dependence of at least one input signal indicating a requirement for the engine to restart to provide a required power output; receive a target engine speed value dependent on a current driveshaft speed; cause the engine to maintain a speed that is no greater than a target engine speed during a period after receiving the at least one input signal and until a further signal is received indicating that a reconnection of the engine to a driveshaft has been established, the target engine speed being dependent on said target engine speed value; and allow engine speed to exceed the target engine speed after receiving the further signal.

This provides the advantage that the engine speed is kept sufficiently low to prevent a degree of clutch slipping that could otherwise cause the transmission to fail to engage. In addition, where the input signal is provided by a system controller of a system such as a battery recharging system or a heating system, it allows the engine to be reconnected without the occupants of the vehicle being subjected to an uncomfortable sudden increase in acceleration.

It should be noted that the target engine speed value is dependent on a current driveshaft speed but the target engine speed value does not have to be determined from the current driveshaft speed. For example, the current driveshaft speed may be determined indirectly from another speed such as the speed of rotation of road wheels as measured by an ABS system (antilock braking system).

In some embodiments the target engine speed is independent of the required power indicated by the at least one input signal. This provides the advantage that even when the input signal(s) require power that requires the engine to run at a relatively high speed, the target engine speed is not affected by the amount of power required.

In some embodiments the target engine speed value depends on the current driveshaft speed and the ratio of a gear to be engaged.

In some embodiments the controller is configured to determine the target engine speed from the target engine speed value and the ratio of a gear to be engaged.

In some embodiments an expected engine speed is derivable from the ratio of the gear to be engaged and a speed of the vehicle or the current driveshaft speed; and the target engine speed is arranged to be within a predefined difference of the expected engine speed. The predefined difference may comprise a difference of between 0 and 60 revolutions per minute.

In some embodiments the controller is configured to continually receive signals from a transmission control module, the signals comprising a target engine speed value dependent on a current driveshaft speed, the transmission control module being configured to cause the reconnection of the engine to the driveshaft when the engine speed is at, or below, the target engine speed.

In some embodiments, in dependence of the driveshaft speed being at or below a threshold value, the controller is configured to determine a target engine speed dependent on the idle speed of the engine. The target engine speed may be within a predefined speed of the idle speed of the engine.

In some embodiments the controller is configured to allow the engine speed to rise above the target engine speed and fall to the target engine speed before reconnection of the driveshaft to the engine. This provides the advantage that the engine speed may be increased to the target engine speed more rapidly.

In some embodiments the at least one input signal indicating a requirement for the engine to restart to provide a required power output comprises an input signal generated in response to a user input.

In some embodiments the at least one input signal indicating a requirement for the engine to restart to provide a required power output comprises an input signal indicating a brake pressure has been reduced below a threshold value.

In some embodiments the at least one input signal indicating a requirement for the engine to restart to provide a required power output comprises an input signal indicating a user request for acceleration of the vehicle.

In some embodiments the at least one input signal indicating a requirement for the engine to restart to provide a required power output comprises an input signal indicating a user request for a change of gear.

In some embodiments the controller is configured to cause restarting of power generation by the engine and increase the speed of the engine, before the reconnection of the engine to the driveshaft, at a rate that depends upon the at least one input signal. This provides the advantage that the engine speed may be increased to the target engine speed more rapidly when required.

In some embodiments the at least one input indicating a requirement for the engine to restart power generation comprises a request for power from a system of the vehicle that requires power to perform a function. The function may comprise at least one of the group comprising: battery recharging; heating; ventilation; and air conditioning.

In some embodiments the at least one criterion comprises at least one of the vehicle speed being below a first threshold value and a brake pressure being above a second threshold value.

According to another aspect of the invention there is provided a controller comprising: an electronic processor having an electrical input for receiving at least one input signal and a further signal; and an electronic memory device electrically coupled to the electronic processor and having instructions stored therein, wherein the instructions are configured to cause the electronic processor to: cause stopping of power generation of the engine during movement of the vehicle in dependence on at least one criterion being met; cause restarting of power generation by the engine, in dependence of at least one input signal indicating a requirement for the engine to restart to provide a required power output; receive a target engine speed value dependent on a current driveshaft speed; cause the engine to maintain a speed that is no greater than a target engine speed during a period after receiving the at least one input signal and until a further signal is received indicating that a reconnection of the engine to a driveshaft has been established, the target engine speed being dependent on said target engine speed value; and allow engine speed to exceed the target engine speed after receiving the further signal.

According to a further aspect of the invention there is provided a control system for controlling an engine of a vehicle and for controlling connection and disconnection of the engine to a driveshaft, the control system being configured to: enable disconnection of the engine to the driveshaft and stop power generation of the engine during movement of the vehicle; and in dependence of at least one input indicating a requirement for the engine to restart to provide a required power output, cause restarting of power generation by the engine and reconnection of the engine to the driveshaft, wherein the control system is configured to limit the speed of the engine to be no more than a target engine speed when reconnecting the engine to the driveshaft, and the target engine speed is dependent on a current driveshaft speed.

This provides the advantage that the engine speed is kept sufficiently low to prevent a degree of clutch slipping that could otherwise cause the transmission to fail to engage. In addition, where the input signal is provided by a system controller of a system such as a battery recharging system or a heating system, it allows the engine to be reconnected without the occupants of the vehicle being subjected to an uncomfortable sudden increase in acceleration.

In some embodiments the target engine speed is independent of the input indicating the required power output.

In some embodiments the target engine speed is dependent on the current driveshaft speed and the ratio of a gear to be engaged.

In some embodiments, in dependence of the driveshaft speed being at or below a threshold value, the control system is configured to determine the target engine speed dependent on the idle speed of the engine.

In some embodiments, the at least one input signal indicating a requirement for the engine to restart to provide a required power output comprises an input signal generated in response to a user input.

In some embodiments the at least one input indicating a requirement for the engine to restart power generation comprises a request for power from a system of the vehicle that requires power to perform a function.

In some embodiments the control system comprises a controller as described in any one of the previous paragraphs and a transmission control module, the transmission control module being configured to continually provide signals to the controller, said signals being dependent on a current driveshaft speed, and to cause the reconnection of the engine to the driveshaft when the engine speed is at, or below, the target engine speed.

According to another further aspect of the invention there is provided a vehicle comprising a control system in accordance with any one of the preceding paragraphs.

According to a still further aspect of the invention there is provided a method of controlling an engine of a vehicle, the method comprising: causing stopping of power generation of the engine during movement of the vehicle in dependence on at least one criterion being met; causing restarting of power generation by the engine, in dependence of receiving at least one input signal indicating a requirement for the engine to restart to provide a required power output; receiving a target engine speed value that is dependent on a current driveshaft speed; causing the engine to maintain a speed that is no greater than a target engine speed during a period after receiving the at least one input signal and until a further signal is received indicating that a reconnection of the engine to a driveshaft has been established, the target engine speed being dependent on said target engine speed value; and allowing the engine speed to exceed the target engine speed after the reconnection of the engine to the driveshaft.

According to a still further aspect of the invention there is provided a non-transitory storage medium storing a program which when run on a processor cause the processor to: cause stopping of power generation of the engine during movement of the vehicle in dependence on at least one criterion being met; cause restarting of power generation by the engine, in dependence of receiving at least one input signal indicating a requirement for the engine to restart to provide a required power output; receive a target engine speed value that is dependent on a current driveshaft speed; cause the engine to maintain a speed that is no greater than a target engine speed during a period after receiving the at least one input signal and until a further signal is received indicating that a reconnection of the engine to a driveshaft has been established, the target engine speed being dependent on said target engine speed value; and allow the engine speed to exceed the target engine speed after the reconnection of the engine to the driveshaft.

According to a yet further aspect of the invention there is provided a method of controlling a an engine and a transmission of a vehicle, the method comprising: enabling disconnection of the engine to a driveshaft and stopping power generation of the engine during movement of the vehicle; and in dependence of at least one input indicating a requirement for the engine to restart to provide a required power output, causing restarting of power generation by the engine and reconnection of the engine to the driveshaft, wherein the speed of the engine is limited to be no more than a target engine speed when reconnecting the engine to the driveshaft, and the target engine speed is dependent on a current driveshaft speed.

According to a still further aspect of the invention there is provided a control system comprising: an electronic processor having an electrical input for receiving at least one input signal and a further signal; and an electronic memory device electrically coupled to the electronic processor and having instructions stored therein, wherein the instructions are configured to cause the electronic processor to enable disconnection of the engine to the driveshaft and stop power generation of the engine during movement of the vehicle; and in dependence of at least one input indicating a requirement for the engine to restart to provide a required power output, cause restarting of power generation by the engine and reconnection of the engine to the driveshaft, wherein the control system is configured to limit the speed of the engine to be no more than a target engine speed when reconnecting the engine to the driveshaft, and the target engine speed is dependent on a current driveshaft speed.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
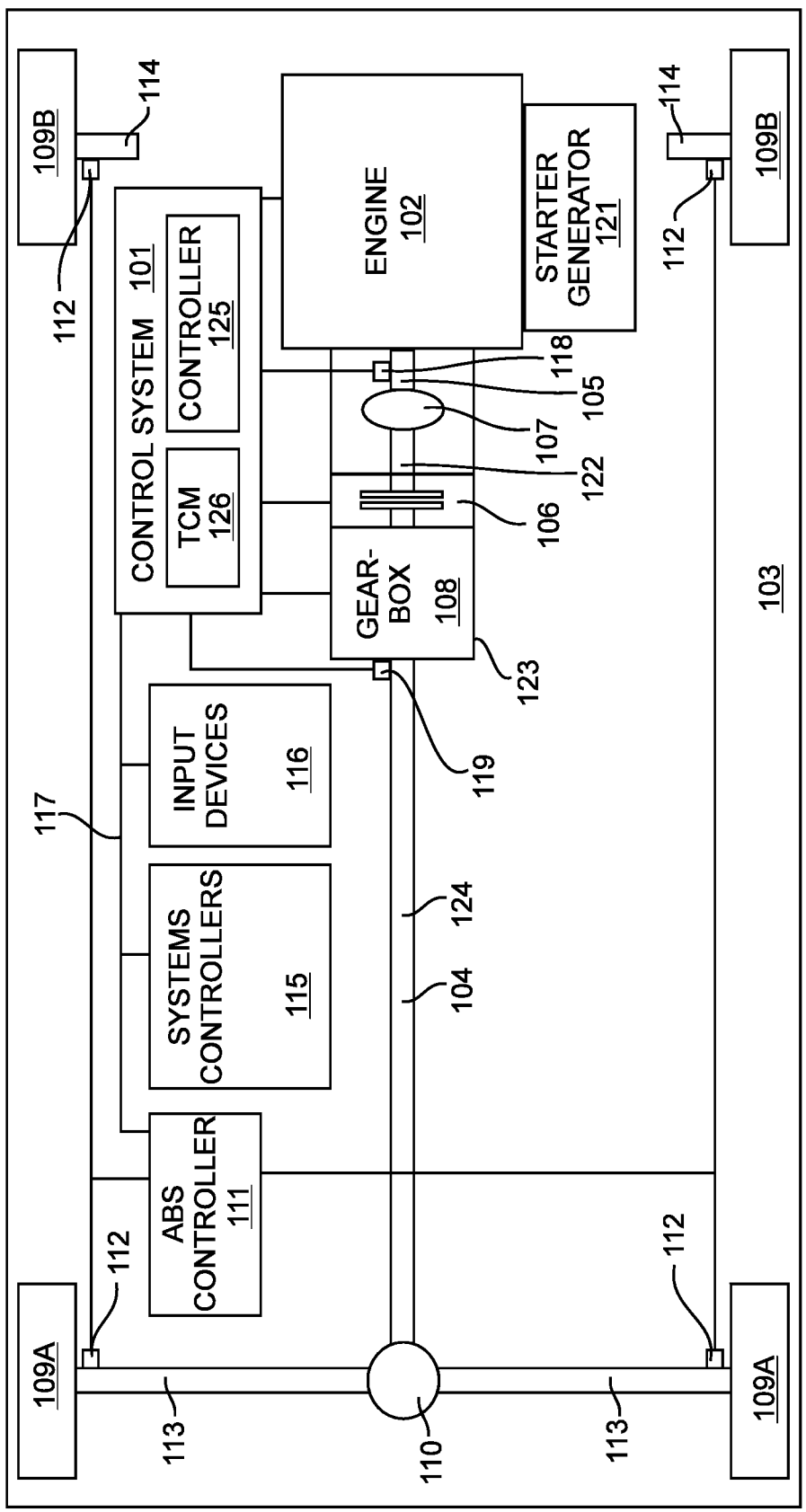
FIG. 1 shows schematically a vehicle 103 comprising an engine 102 and a control system 101 for controlling power output of the engine 102.

The Figures illustrate a control system 101 for controlling an engine 102 of a vehicle 103 and for controlling connection and disconnection of the engine 102 to a driveshaft 104, the control system 101 being configured to: enable disconnection of the engine 102 to the driveshaft 104 and stop power generation of the engine 102 during movement of the vehicle 103; and in dependence of at least one input indicating a requirement for the engine 102 to restart to provide a required power output, cause restarting of power generation by the engine 102 and reconnection of the engine 102 to the driveshaft 104, wherein the control system 101 is configured to limit the speed of the engine 102 to be no more than a target engine speed when reconnecting the engine 102 to the driveshaft 104, and the target engine speed is dependent on a current driveshaft speed.

In some embodiments the control system comprises a controller 125 and a transmission control module 126, the transmission control module 126 being configured to continually provide signals to the controller 125, the signals being dependent on a current driveshaft speed, and to cause the reconnection of the engine 102 to the driveshaft 104 when the engine speed is at, or below, the target engine speed.

The Figures also illustrate a controller 125 for controlling an engine 102 of a vehicle 103, the controller 125 being configured to: cause stopping of power generation by the engine 102 during movement of the vehicle 103 in dependence on at least one criterion being met; cause restarting of power generation by the engine 102, in dependence of at least one input signal indicating a requirement for the engine 102 to restart to provide a required power output; receive a target engine speed value dependent on a current driveshaft speed; cause the engine 102 to maintain a speed that is no greater than a target engine speed during a period after receiving the at least one input signal and until a further signal is received indicating that a reconnection of the engine 102 to a driveshaft 104 has been established, the target engine speed being dependent on said target engine speed value; and allow engine speed to exceed the target engine speed after receiving the further signal.

A vehicle 103 comprising an engine 102 and a control system 101 for controlling power output of the engine 102 is shown schematically in FIG. 1. The engine 102 comprises an internal combustion engine and may form a hybrid engine, for example having an integrated starter generator 121, such as a belt-driven integrated starter generator. The starter generator 121 is arranged to generate electrical energy during operation of the engine 102 and to turn the engine 102 to restart it. Alternatively, the engine 102 may be provided with a separate starter motor and alternator for generating electrical energy.

In the present example, the engine 102 has an output shaft 105 connected to a torque convertor 107 of an automatic transmission 123. The torque convertor has an output shaft 122 connected to a clutch mechanism 106 of a gearbox 108. The clutch mechanism 106 is arranged to open and close in response to instructions received from the control system 101 in order to disengage and engage gears within the gearbox 108. When closed, the clutch mechanism 106 enables torque provided by the engine 102 via the torque convertor 107 and the gearbox 108 to provide torque to a driveshaft 104 of a driveline 124. When open, the clutch mechanism 106 disconnects the engine 102 from driveshaft 104.

The driveshaft 104 is arranged to provide torque to rear wheels 109A via a differential 110 and rear wheel axles 113. In the present example, the vehicle 103 is a rear-wheel drive vehicle and therefore only the rear wheels 109A are driven by the engine 102. However, it will be understood that in an alternative embodiment the vehicle 103 may be a front-wheel drive, in which only the front wheels 109B are driven by the engine 102 via separate driveshafts (or halfshafts). Similarly, in another alternative embodiment the vehicle 103 may be a four-wheel drive, in which the rear wheels 109A are driven via a first driveshaft and the front wheels 109B are driven by a second driveshaft.

The vehicle 103 may also include an ABS (anti-lock braking system) of a known type that includes an ABS controller 111 and sensors 112 on both the rear wheel axles 113 and front wheel axles 114. The sensors 112 may be arranged to provide signals to the ABS controller 111 indicative of the rotational speed of each wheel 109A, 109B and/or applied brake pressure. The ABS controller 111 may be arranged to provide information indicating brake pressure and vehicle speed to the control system 101.

The vehicle 103 may also comprise various other electronic control units (ECUs) for control systems within the vehicle 103 that are not directly concerned with the control of the engine 102 or the transmission of power to the wheels 109A. These other electronic control units are represented in FIG. 1 as system controllers 115. The system controllers 115 may be arranged to control functions performed by various systems of the vehicle 103 such as controlling recharging of batteries, or controlling heating, air-conditioning and/or ventilation. Energy required by the systems to perform the functions may be generated by engine 102.

The vehicle 103 also includes several input devices 116 that enable inputs to be provided to the control system 101 for controlling the speed of the vehicle 103. The input devices 116 may comprise manual input devices such as: a foot pedal for increasing engine torque (which may be referred to as an "accelerator pedal" or "throttle"); a brake pedal; a paddle actuator to enable a driver of the vehicle 103 to force a change of gear in an automatic vehicle; a mode selection device, such as a button or switch to enable a change of drive mode by the control system 101, for example to change from an energy saving mode (or an "ECO mode") to a "sports mode".

The ABS controller 111, the system controllers 115 and the input devices 116 may be arranged to communicate with the control system 101 via one or more communication buses 117.

The control system 101 may comprise a single electronic control unit or as will be described below with reference to FIG. 4, it may comprise several electronic control units and the required processing and control functions may be distributed over the several ECUs.

Figure 10:
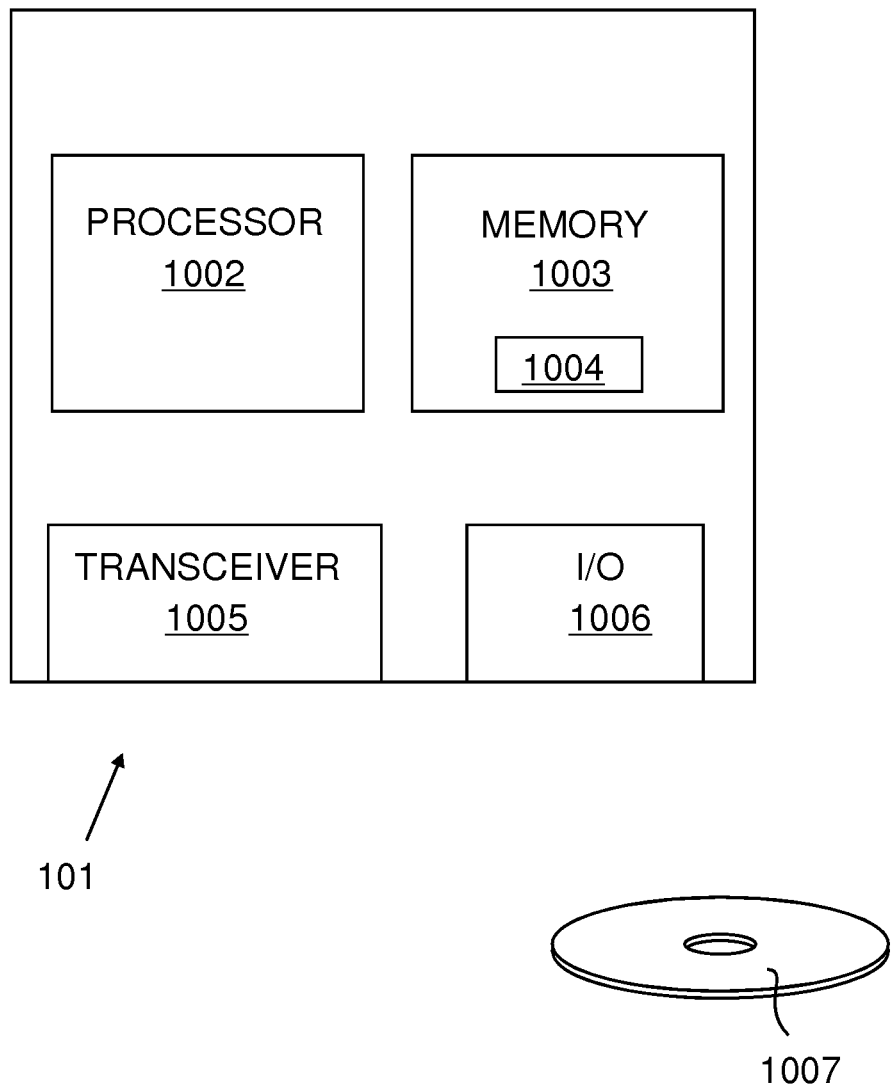
FIG. 10 shows schematically an example of the control system 101 of FIG. 1.

An example of the control system 101, comprising an electronic control unit (ECU), is shown schematically in FIG. 10. The electronic control unit 101 comprises control means, which may comprise an electronic processor 1002 and an electronic memory device 1003 electrically coupled to the electronic processor 1002 and having program instructions 1004 stored therein, which when performed by the processor 1002 configure it to perform the method described below.

The ECU 101 may comprise a transceiver 1005 for enabling communication over the bus 117. The ECU 101 may comprise additional input and output interfaces 1006 to enable signals to be received from sensors such as sensor 118 and 119 and provide signals to the engine 102 and/or starter generator 121 to start the engine and to control power output and engine speed.

The instructions 1004 may be provided to the electronic memory device 1003 via a computer readable storage medium 1007, such as a CD-ROM, on which the instruction 1004 are stored.

Returning to FIG. 1, the control system 101 is configured to control the power output of the engine 102, for example by controlling the rate of fuel injection. The control system 101 is also configured to control the clutch mechanism 106 to enable connection and disconnection of the engine 102 to the driveshaft 104 and to select appropriate gears of the gear box 108.

To enable fuel to be saved, the control system 101 is configured to enable disconnection of the engine 102 from the driveshaft 104 and stop power generation of the engine 102 when the vehicle 103 is stationary and also during movement of the vehicle 103 if one or more criteria are met that indicate that the vehicle 103 is being brought to a stop. For example, the criteria may include the brakes being applied and the speed of the vehicle 103 being below a threshold speed, and both of these criteria may have to be met to enable disconnection and stopping of the engine 102.

In addition, the control system 101 is configured to cause restarting of power generation by the engine 102 and reconnection of the engine 102 to the driveshaft 104 in dependence of at least one input indicating a requirement for the engine 102 to restart to provide a required power output. For example, when the engine 102 has previously been disconnected from the driveshaft 104 and stopped, the control system 101 may receive an input signal from an input device 116 such as an accelerator pedal, a paddle actuator or a mode selector indicating that an increase in vehicle speed is required, or an input signal from the ABS controller 111 indicating that braking is no longer being applied or that vehicle speed is no longer below a threshold value, or an input signal from one or more of the system controllers 115 indicating that power is required to perform a function that it controls.

The control system 101 is configured to limit the speed of the engine 102 to be no more than a target engine speed when reconnecting the engine 102 to the driveshaft 104. The target engine speed is determined by the control system 101 and is dependent on a current driveshaft speed, i.e. the rotational speed of the driveshaft 104. This enables the engine 102 to be reconnected to the driveshaft 104 smoothly and minimize vehicle noise, vibration and harshness (NVH) generated by the reconnection. For example, this prevents occupants of the vehicle 103 from experiencing a sudden acceleration of the vehicle 103 at the moment of reconnection.

Figure 2:
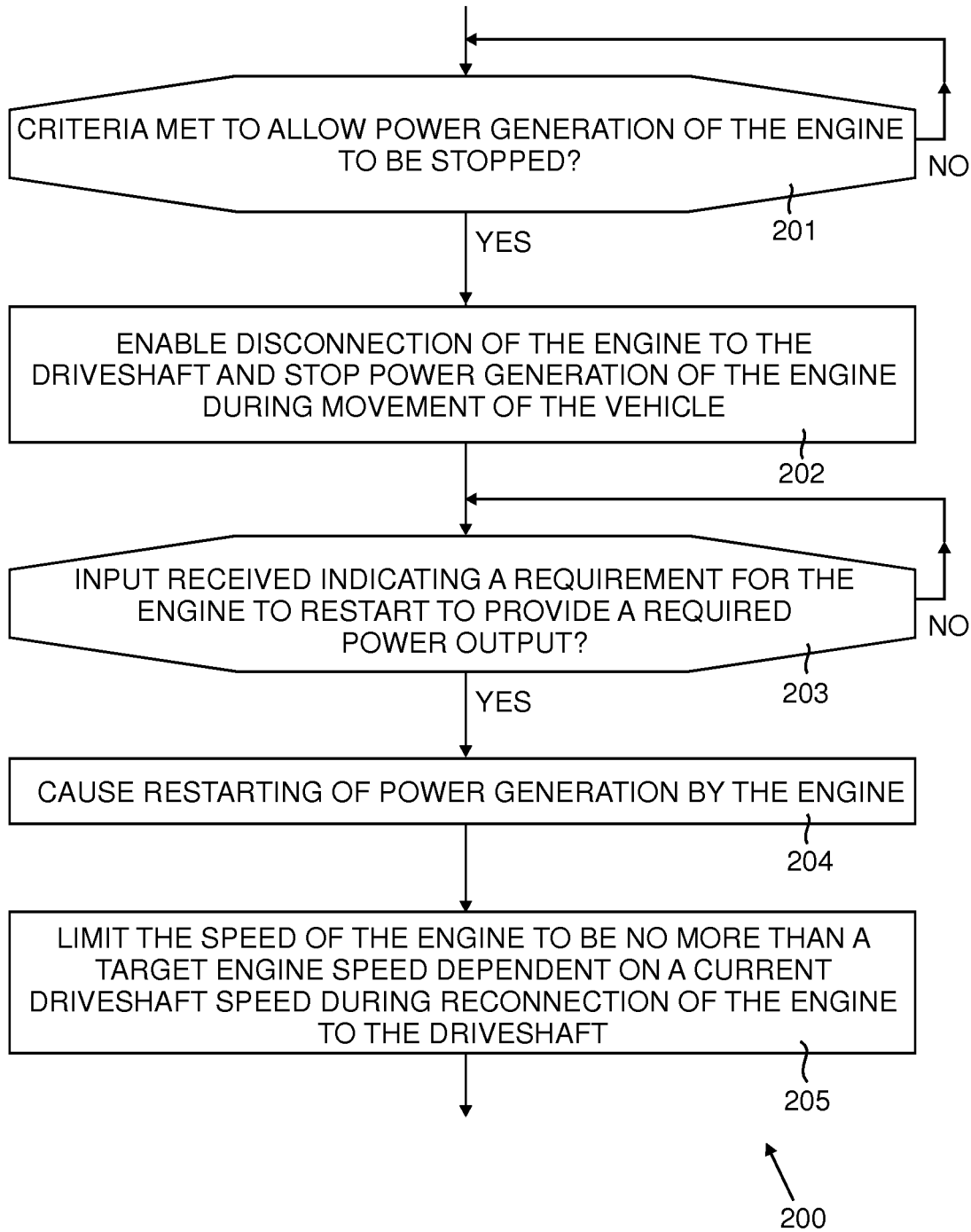
FIG. 2 shows a flowchart outlining a method 200 which may be performed by the control system 101.

An outline of a method 200 which may be performed by the control system 101 is shown in the flowchart of FIG. 2. The method 200 may be performed while the vehicle 103 is moving, i.e. the vehicle speed with respect to the ground/road is not zero. At block 201 of the method 200, it is determined whether all criteria to allow stopping of power generation by the engine 102 have been met. The criteria may include one or more of the following criteria:

(i) the vehicle speed, i.e. speed of the vehicle with respect to the ground/road, is less than a threshold speed, such as 5 kilometres per hour, 10 kilometres per hour, 20 kilometres per hour or another value;

(ii) a measured brake pressure is larger than a threshold pressure;

(iii) reverse gear is not selected;

(iv) a user-selectable mode that prevents stopping of power generation by the engine has not been selected; and (v) accelerator pedal input is less than a threshold value.

In an embodiment, all of the criteria (i) to (v) must be met to enable stopping of power generation by the engine 102 during movement of the vehicle.

If the required criteria are met at block 201 of method 200, at block 202 the control system 101 enables disconnection of the engine 102 from the driveshaft 104, by disengaging the clutch mechanism 106, and stopping of power generation by the engine 102 even during movement of the vehicle 103.

When the vehicle 103 is moving with the engine 102 off and disconnected, the control system 101 repeatedly determines at block 203 if an input signal has been received that indicates a requirement for the engine 102 to restart to provide a required power output. When such an input signal has been received, the control system 101 causes the engine 102 to restart at block 204 and at block 205 the speed of the engine 102 is limited to be no more than a target engine speed that is dependent on a current driveshaft speed during reconnection of the engine 102 to the driveshaft 104.

The target engine speed may be independent of the input signal indicating the required power output. That is, the target engine speed may be independent of the power output required by the system or device that provided the input signal.

The engine speed, i.e. the rotational speed of the output shaft 105 of the engine 102, may be determined from a signal received from a sensor 118 provided at the output shaft 105 of the engine 102. The current driveshaft speed may similarly be determined from a signal received from a sensor 119 that is configured to measure the rotational speed of the driveshaft 104. Alternatively, the driveshaft speed may be determined from the vehicle speed, the road wheel radius and the gear ratio provided by the differential 110. The vehicle speed may be obtained, for example, from signals provided by the ABS controller 111, or alternatively from a global navigation satellite system (GNSS) unit, such as a GPS (global positioning system) unit (not shown), mounted in the vehicle 103.

The control system 101 may be configured to set the target engine speed to be dependent on the idle speed of the engine 102, when the driveshaft speed is at or below a threshold value. That is, when the rotational speed of the driveshaft 104 is very slow or zero, the control system 101 may be arranged to set the target engine speed to be the idle speed of the engine 102, or within a predefined speed of the idle speed. If the driveshaft speed is above a threshold value then the target engine speed may be determined from the driveshaft speed. For example, the target engine speed may be determined to be within a predefined difference of an expected engine speed derivable from the current driveshaft speed and the ratio of a gear to be engaged when the engine 102 is reconnected via the clutch mechanism 106. That is, the target engine speed may be determined to be within a predefined difference of the speed that the engine 102 would have at the current rotational speed of the driveshaft 104 if the engine 102 were connected to the driveshaft 104 (and without clutch slipping). The predefined difference may be between 0 and 60 revolutions per minute Therefore, the target engine speed may be chosen so that when the engine 102 is operating at the target engine speed, it would cause the input side of the clutch mechanism 106 to rotate at the same speed or within a predefined difference of an output side of the clutch mechanism 106. The difference in speed may depend upon whether the clutch mechanism 106 is designed to allow clutch slipping during reengagement.

Figure 3:
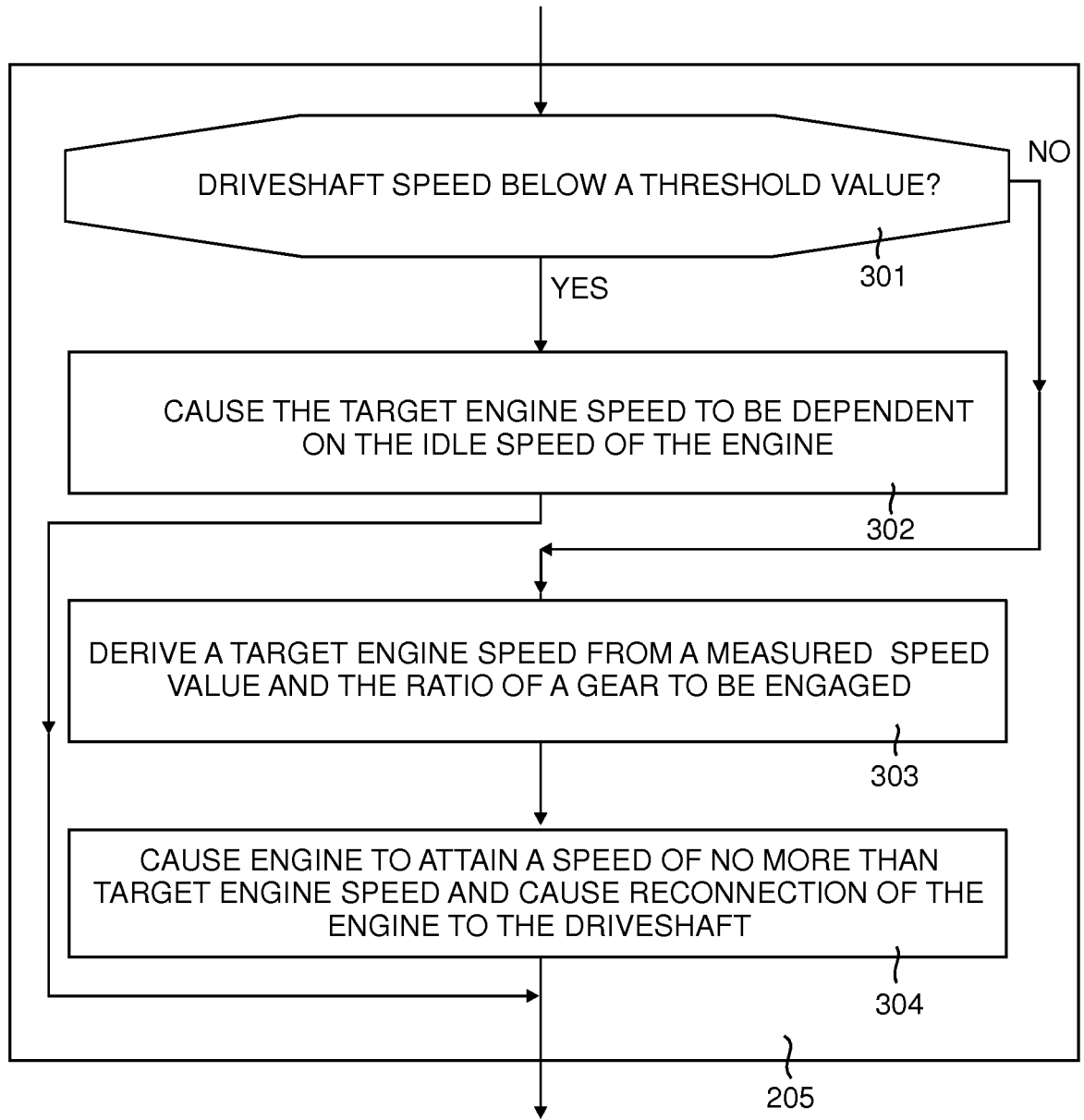
FIG. 3 shows a flowchart providing an example of the processes that may be included within the process of block 205 of FIG. 2.

Examples of the processes that may be included within the process of block 205 are shown in the flowchart of FIG. 3. At block 301 it may be determined whether the driveshaft speed is below a threshold value and if so then the target engine speed may be caused to be dependent on the idle speed of the engine 102 at block 302. Alternatively, if the driveshaft speed is not found to be below a threshold value at block 301 a target engine speed may be determined from a measured speed value, such as the current driveshaft speed or the vehicle speed, and the ratio of a gear to be engaged at block 303. If target engine speed is determined from vehicle speed, then the determination may also take account of the gear ratio provided by the differential 110.

At block 304 the control system 101 causes the engine 102 to attain a speed of no more than the target engine speed and causes the clutch mechanism 106 to close to reconnect the engine 102 to the driveshaft 104 when the engine speed is no more that the target engine speed. As will be described in further detail below, the engine 102 may attain a speed that is greater than the target engine speed before the reconnection is enabled, but the control system 101 ensures that at the moment that the reconnection takes place, the engine speed is at or below the target engine speed.

As shown in FIG. 1, the control system 101 may be embodied in a single electronic control unit which has several different software modules are each dedicated to a respective function. Thus, the control system 101 may comprise a controller 125 or powertrain control module (PCM) 125 arranged to control the operation of the engine 101 and a transmission control module (TCM) 126 arranged to control operation of the clutch mechanism 106 and selection of gears in gearbox 108. Alternatively, as shown in FIG. 4, the controller 125 and TCM 126 may each be provided in a respective electronic control unit which are arranged to communicate over the communication bus 117. All other features of the vehicle 103 of FIG. 4 may be the same as the vehicle 103 of FIG. 1 and therefore the features have been provided with the same references.

Figure 4:
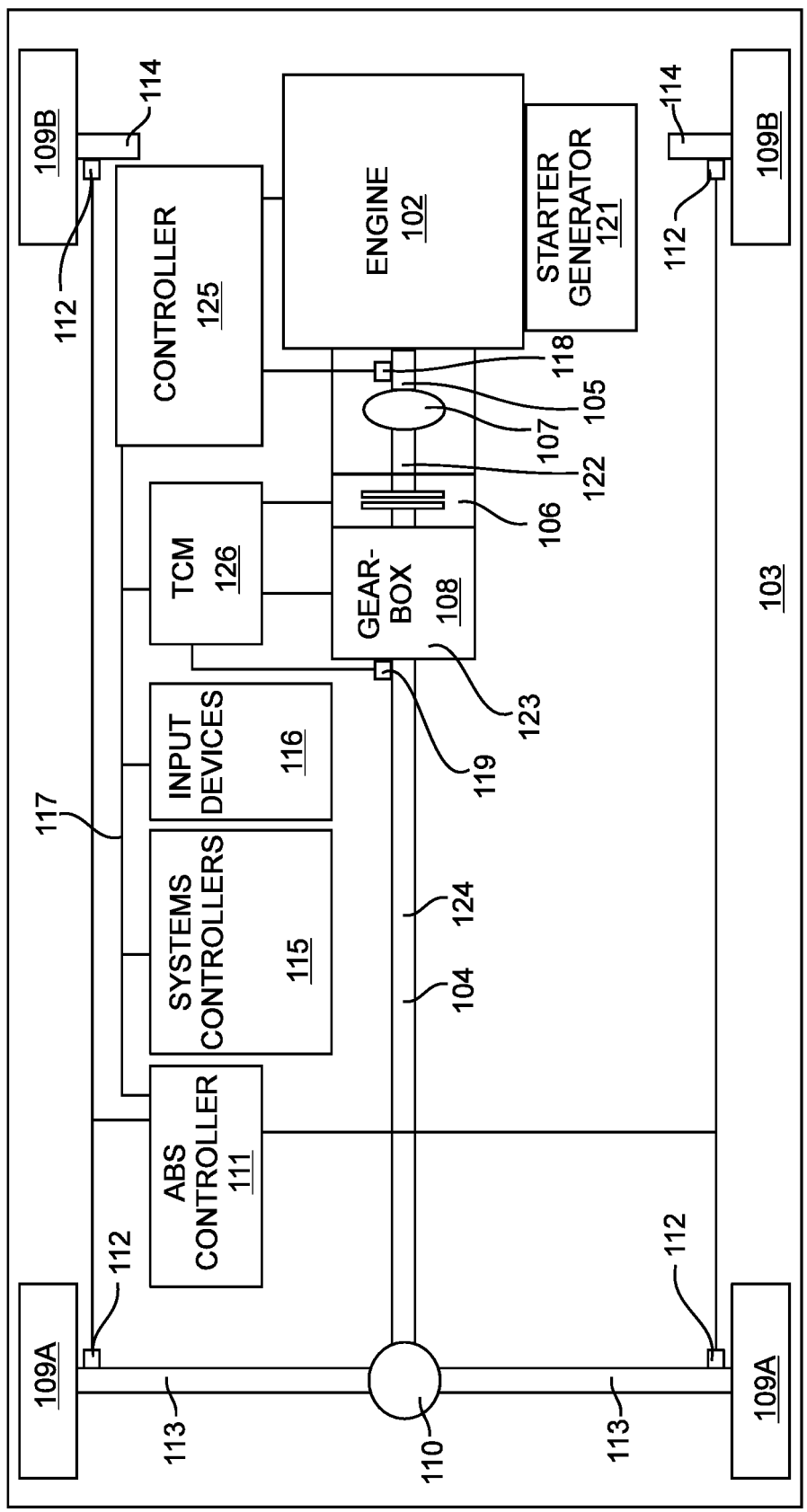
FIG. 4 shows schematically a vehicle 103 comprising an engine 102 and a controller 125 for controlling power output of the engine 102.
Figure 11:
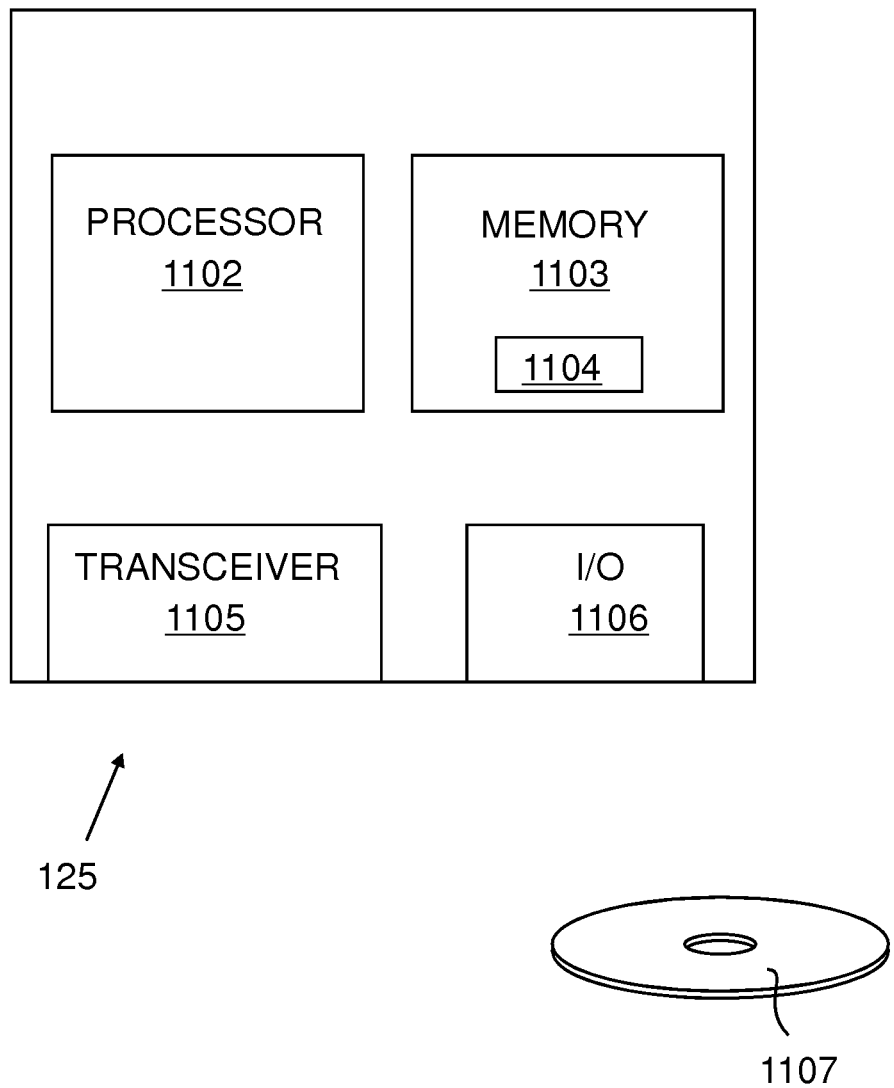
FIG. 11 shows schematically an example of the controller 125 of FIG. 4.

An example of the controller 125 of FIG. 4 is shown schematically in FIG. 11. The controller 125 of FIG. 11 comprises an electronic control unit (ECU) 125 including control means, which may comprise an electronic processor 1102 and an electronic memory device 1103 electrically coupled to the electronic processor 1102 and having program instructions 1104 stored therein, which when performed by the processor 1102 configure it to perform the method described below.

The ECU 125 may comprise a transceiver 1105 for enabling communication over the bus 117. The ECU 125 may comprise additional input and output interfaces 1006 to enable signals to be received from sensors such as sensor 118 and provide signals to the engine 102 and/or starter generator 121 to start the engine and to control power output and engine speed.

The instructions 1104 may be provided to the electronic memory device 1103 via a computer readable storage medium 1107, such as a CD-ROM, on which the instruction 1104 are stored.

With regard to FIGS. 1 and 4, the controller 125 may be configured to receive input signals from: the ABS controller 111 regarding the brake pressure that is being applied and the current speed of the vehicle 103; the system controllers 115 indicating whether power from the engine 102 is required; the input devices 116 indicating whether respective criteria are met, such as accelerator pedal input being less than a threshold value; sensor 118 indicating current engine speed; and the TCM 126.

In an embodiment, when the engine 102 has been stopped during movement of the vehicle 103, signals are continually provided by the TCM 126 to the controller 125, which include a target engine speed value, indicating an engine speed required for clutch mechanism reengagement. (By "signals are continually provided" it is meant that the signals are continuously provided or repeatedly frequently provided.)

The target engine speed value may be the actual target engine speed that the engine 102 must attain in order for clutch mechanism reengagement to occur. In this case the TCM 126 performs the determination of the target engine speed, for example, from the driveshaft speed and the gear ratio to be used when reconnection occurs or the vehicle speed, the radius of the road wheels 109A and the gear ratios provided by the transmission 123 and the differential 110. Alternatively, the target engine speed value provided to the controller 125 may indicate a speed, such as driveshaft speed, which may be provided along with the gear ratio to be used when reconnection occurs, and the controller 125 is then arranged to determine the target engine speed from the information received from the TCM 126.

The TCM 126 may also be configured to provide signals to the controller 125 indicating the status of the clutch mechanism 106, i.e. whether the clutch mechanism is engaged or disengaged.

The controller 125 is configured to provide output signals to the engine 102 to cause it to start and to control engine speed. For example, where the engine 102 is a hybrid engine, it may be started via its integrated starter generator 121. The controller 125 is also configured to provide signals to the TCM 126 indicating that disengagement of the clutch mechanism 106 is required, when the engine 102 is to be stopped.

Figure 5:
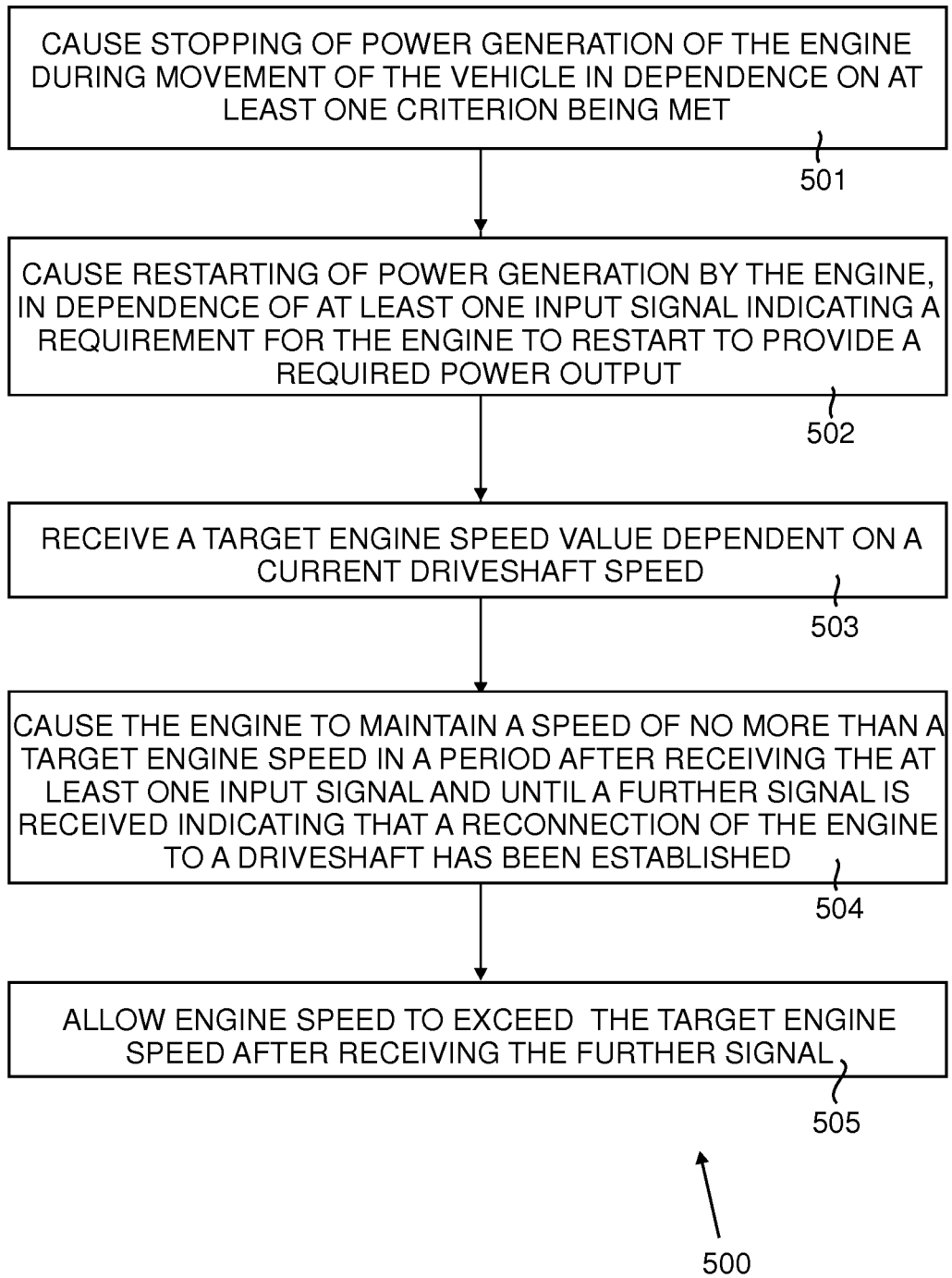
FIG. 5 shows a flowchart outlining an example of a method 500 which may be performed by the controller 125.

An example of a method 500 which may be performed by the controller 125 is outlined in the flowchart of FIG. 5. At block 501 the engine 102 is caused to stop power generation during movement of the vehicle 103 in dependence on at least one criterion being met. The at least one criterion may be one of the criteria labelled (i) to (v) described above. Before causing stopping of the engine 102, the controller 125 may provide a signal to the TCM 126 instructing it to cause disengagement of the clutch mechanism 106. The controller 125 may then await a confirmation by the TCM 126 that the clutch mechanism is disengaged before stopping the engine 102.

With the engine 102 stopped, in dependence of receiving at least one input signal indicating a requirement for the engine 102 to restart and provide a required power output, the engine 102 is caused to be started at block 502. This may be achieved by providing signals to the integrated starter generator 121 and the fuel injection system of the engine 102.

At block 503 a target engine speed value dependent on the current driveshaft speed is received, for example from the TCM 126. It may be noted that although block 503 is shown following block 502, the process of block 503 may be performed before block 502.

At block 504, the engine 102 is caused to maintain a speed of no more than a target engine speed during a period after receiving the at least one input signal and until a further signal is received, for example from the TCM 126, indicating that a reconnection of the driveshaft 104 to the engine 102 has been established. The target engine speed is dependent on the target engine speed value received at block 503 and, in an embodiment, the target engine speed value may actually be the target engine speed. However, the target engine speed value may be another speed, such as a driveshaft speed or vehicle speed, and the target engine speed may be determined from the target engine speed value, for example using the ratio of the gear to be engaged.

After block 504, in which reconnection is confirmed by receiving the further signal, the engine speed is allowed to exceed the target engine speed at block 505. The speed of the engine 102 may be varied as required by the input devices 116.

Figure 6:
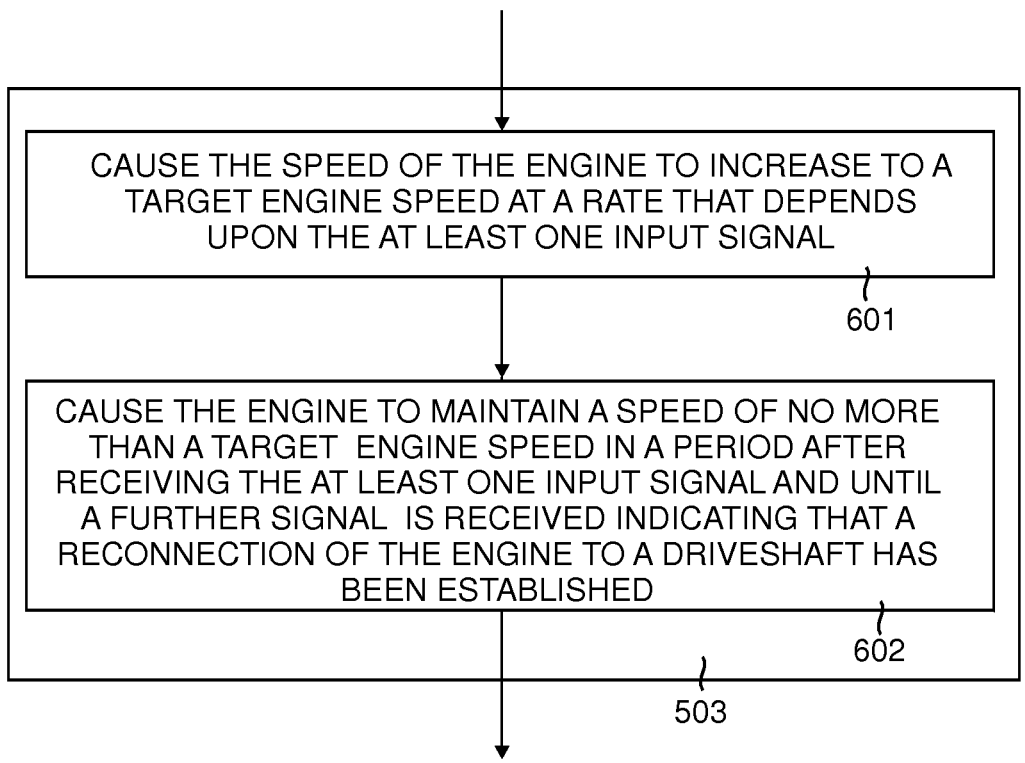
FIG. 6 shows a flowchart providing an example of the processes that may be performed at block 504 of FIG. 5.

An example of the processes that may be performed at block 504 of FIG. 5 is shown in a flowchart in FIG. 6. At block 601 the speed of the engine 102 is increased to a target engine speed at a rate that depends upon the at least one input signal. For example, when an input signal is received from an accelerator pedal that indicates a fast acceleration of the vehicle is required, the engine speed may be increased at a higher rate that when an input signal is received from the accelerator pedal that indicates a relatively slower acceleration is required.

At block 602 the engine 102 is caused to maintain a speed that is no greater than the target engine speed during a period after receiving the at least one input signal and until the further signal is received that indicates that a reconnection of the engine 102 to the driveshaft 104 had been established.

Figure 7:
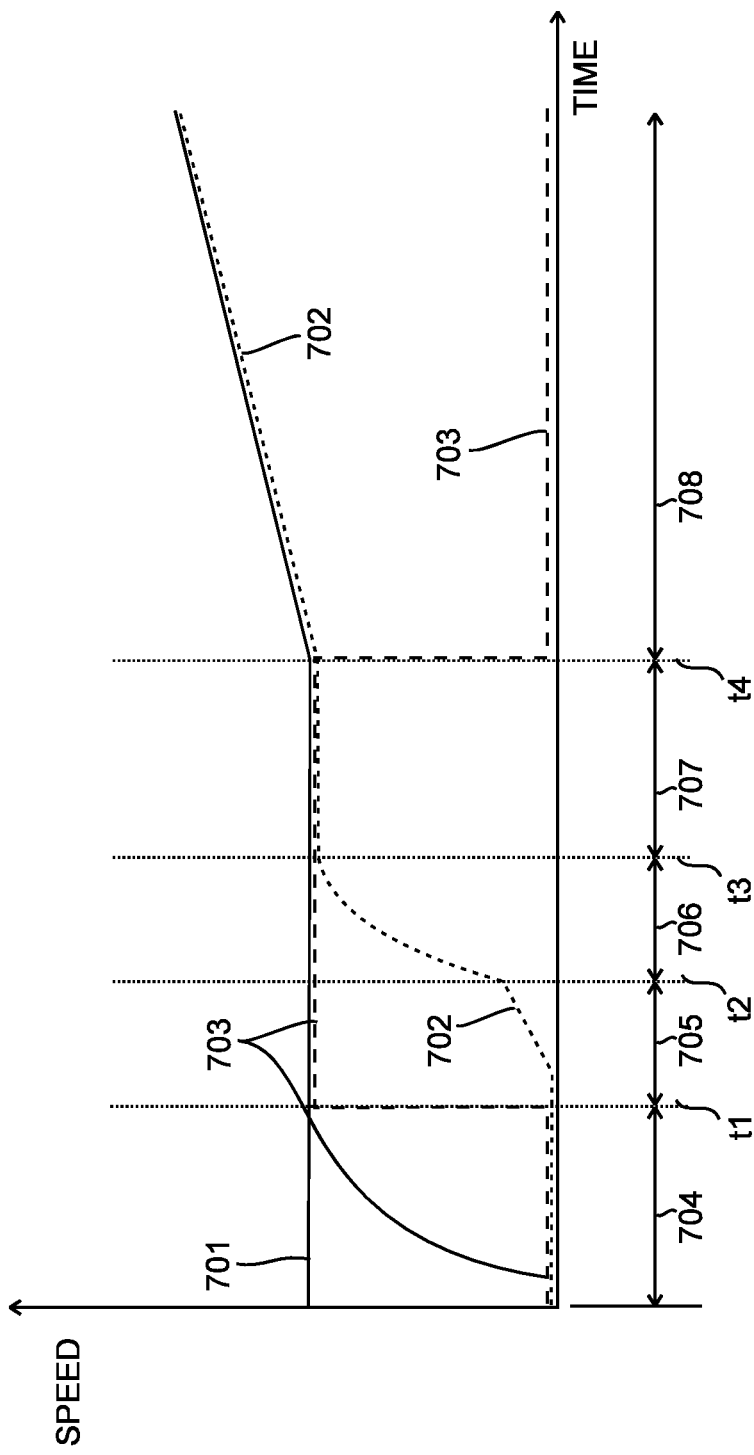
FIG. 7 shows a graph illustrating an example of the operation of the controller 125 during the method blocks 502 to 505 of FIG. 5.

A graph is shown in FIG. 7 illustrating an example of the operation of the controller 125 during the method blocks 502 to 505 of FIG. 5, in response to receiving an input signal from a user operated input device 116 such as an accelerator pedal. A first line 701 represents the expected engine speed given the current speed of the vehicle 103 and the currently selected gear. That is, the first line 701 represents speed that the engine 102 would have at the current speed of the vehicle 103 if the engine 102 were connected to the driveshaft 104 (and without clutch slipping). A second line 702 represents the actual engine speed, for example as measured by the sensor 118 on the output shaft 105 of the engine 102. A third line 703 represents the target engine speed value provided by the TCM 126 to the controller 125.

Figure 8:
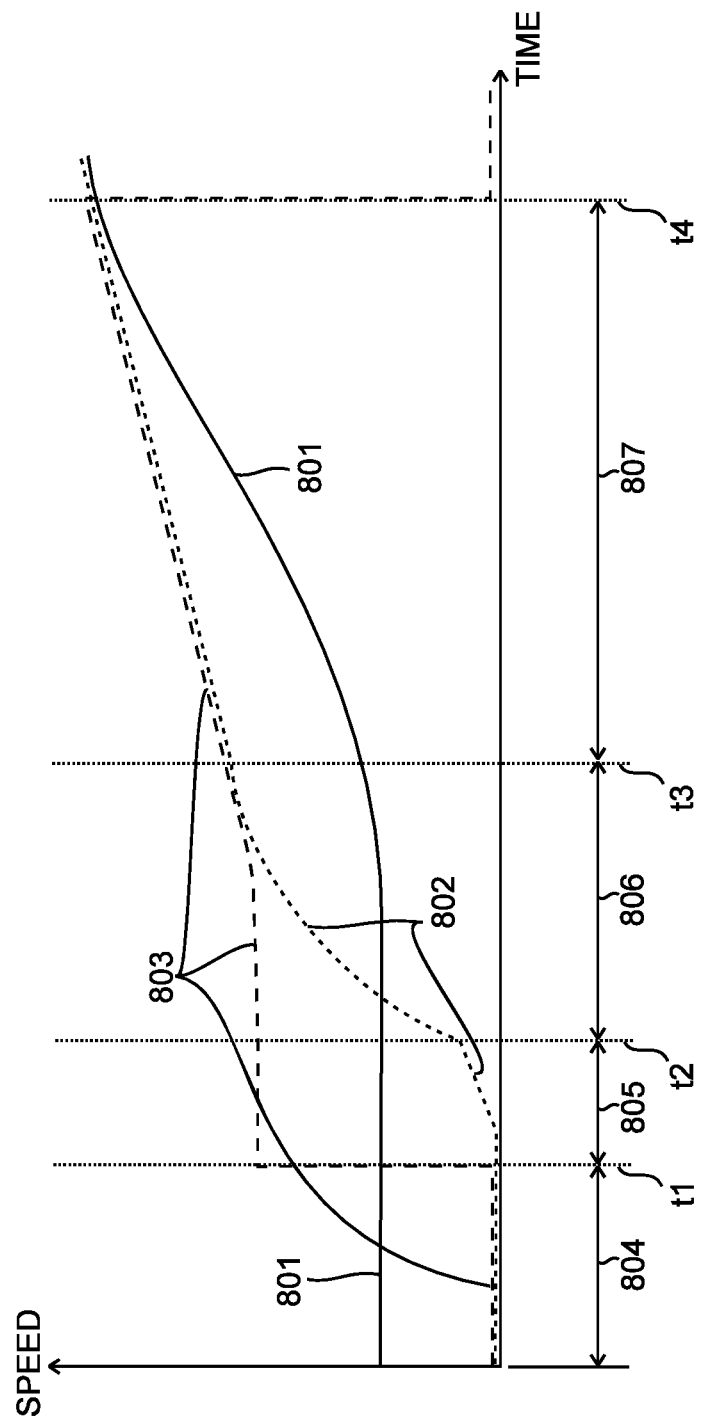
FIG. 8 shows a second graph illustrating a second example of the operation of the controller 125 during the method blocks 502 to 505 of FIG. 5.
Figure 9:
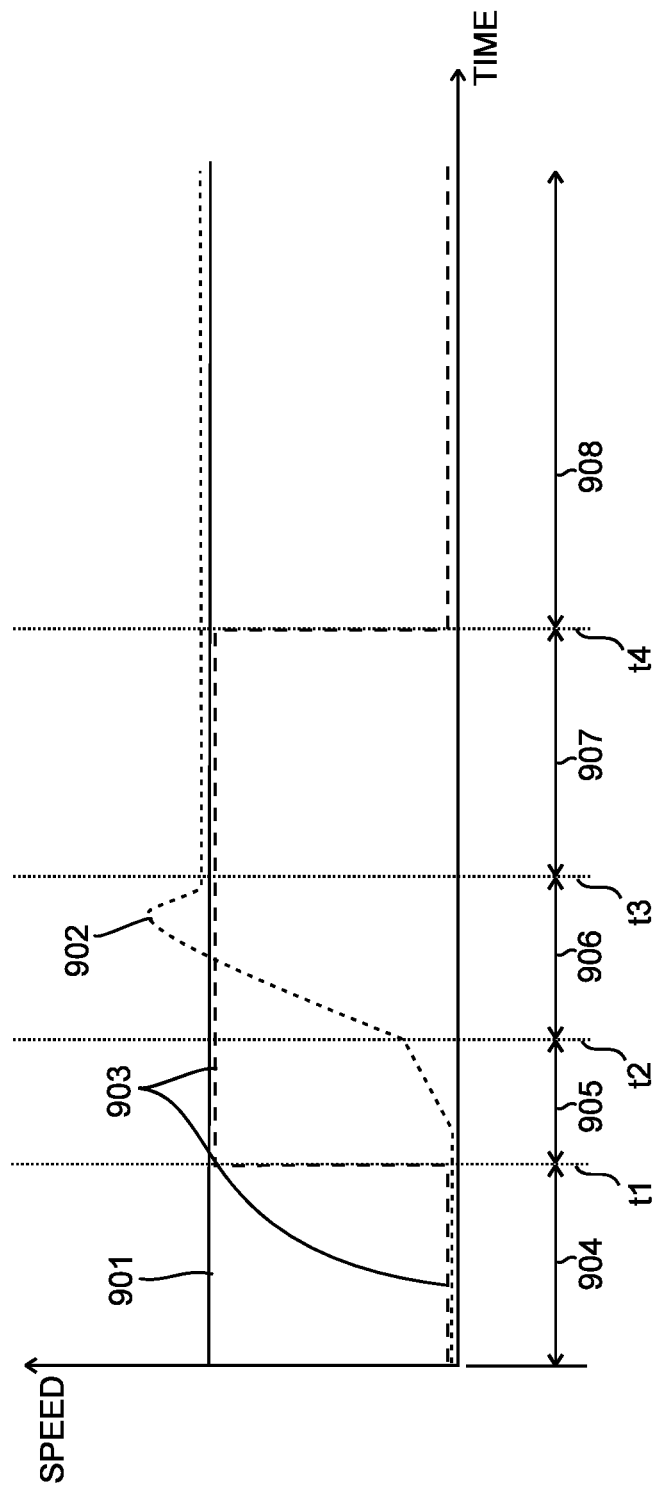
FIG. 9 shows a third graph illustrating a third example of the operation of the controller 125 during the method blocks 502 to 505 of FIG. 5.

In the present example, and those of FIGS. 8 and 9, the target engine speed value provided by the TCM 126 is set at zero when no control over engine speed is required in respect of an engine reconnection to the driveshaft, and the controller 125 is configured to interpret the zero value correspondingly.

In addition, to simplify the description, it is assumed that in the present example when control over engine speed is required, the target engine speed value is the same as the target engine speed. (i.e. no additional processing of the target engine speed value is required by the controller 125 in order to determine the target engine speed.)

In a first period 704, the engine 102 is in a stopped state and therefore line 702 shows that the engine speed is zero. Line 701 shows that the expected engine speed is positive because the vehicle is moving. The line 703 is zero because no reconnection of the engine 102 to the driveshaft 104 is taking place in the first period 704. At the end of the first period 704, at time t1, an input signal from a user operated input device 116, such as an accelerator pedal, is received resulting in the target engine speed value (line 703), increasing to a new value. In the present example, the transmission of the vehicle 103 does not have the capability to slip the clutch mechanism 106 and so the target engine speed is arranged to correspond to the expected engine speed (line 701). Also in response to receiving the input signal from the input device 116 at time t1, the engine 102 is started in a second period 705, for example by the integrated starter generator 121. Therefore, the engine speed (line 702) rises during the second period 705.

When the engine starts, at time t2, the speed of the engine 102 begins to increase more rapidly during a third period 706. However, the controller 125 only allows the engine speed (line 702) to increase until it is equal to the target engine speed (line 703). When the engine speed is approximately the same as the target engine speed, but no more than the target engine speed, a fourth period 707 begins at time t3 in which reconnection takes place. At time t3, the controller 125 may provide a signal to the TCM 126 indicating that closure of the clutch mechanism 106 may begin. During this fourth period 707, the engine speed is maintained at or below the target engine speed and the clutch mechanism 106 is closed to reconnect the engine 102 to the driveshaft 104.

When the reconnection is completed, at time t4, the TCM 126 may send a further signal to the controller 125 confirming that reconnection by the clutch mechanism 106 has been completed and the target engine speed value once again indicates that no control over engine speed is required by the TCM 126 in respect of an engine reconnection to the driveshaft. Consequently, the controller 125 is then allowed to increase the engine speed (and vehicle speed) as required by the input signal from the user input device 116 in a fifth period 708.

A second graph is shown in FIG. 8 illustrating a second example of the operation of the controller 125 during the method blocks 502 to 505 of FIG. 5, in response to receiving an input signal from a user operated input device 116 such as an accelerator pedal. A first line 801 represents the expected engine speed given the current speed of the vehicle 103 and the currently selected gear. A second line 802 represents the engine speed, for example as measured by the sensor 118 on the output shaft 105 of the engine 102. A third line 803 represents the target engine speed value provided by the TCM 126 to the controller 125.

In this example, in a first period 804, the engine 102 is stopped and therefore line 802 shows that the engine speed is zero. Line 801 shows that the expected engine speed is positive because the vehicle 103 is moving. The line 803 is zero because no reconnection of the engine 102 to the driveshaft 104 is taking place in the first period 804. At the end of the first period 804, at time t1, an input signal from a user operated input device 116, such as an accelerator pedal, is received resulting in the target engine speed value (line 803) increasing to a new value. In the present example, the clutch mechanism 106 is capable of being slipped and the user's input indicates that acceleration is required. Consequently, in a second period 805 following time t1, the target engine speed value (line 803) is set to be above the expected engine speed (line 801). This allows the engine 102 to reach a higher speed and torque which subsequently allows slipping of the clutch mechanism 106 to apply torque to the road wheels 109B (FIGS. 1 and 4) earlier.

During the second period 805, the engine 102 is started, for example by the integrated starter generator 121, and therefore the engine speed (line 802) increases. At time t2, when the engine 102 starts, a third period 806 begins in which the engine speed (line 802) increases more rapidly towards the target engine speed (line 803). However, the controller 125 only allows the engine speed (line 802) to increase to be approximately equal to the target engine speed (line 803) and no greater than the target engine speed.

When the engine speed (line 802) is approximately the same as the target engine speed (line 803), but no more than the target engine speed, a fourth period 807 begins at time t3 in which reconnection takes place. During the fourth period 807, the engine speed (line 802) is maintained at or below the target engine speed (line 803) and the clutch mechanism 106 is closed to reconnect the engine 102 to the driveshaft 104. However, during closing, the clutch mechanism 106 is slipped to enable some engine torque to be applied to the road wheels 109A and consequently the speed of the vehicle 103 may increase during this period. During the fourth period 807, the target engine speed (line 803) is continually updated and therefore the increase in vehicle speed results in an increase in target engine speed (line 803), which in turn enables the engine speed (line 802) to be correspondingly increased while being maintained at or below the target engine speed.

The fourth period ends at time t4 when reconnection of the engine 102 to the driveshaft 104 is completed, the TCM 126 sets the target engine speed value to indicate that control of engine speed for the reconnection is no longer required, and a further signal may be provided by the TCM 126 to the controller 125 confirming that the clutch mechanism 106 is engaged. Consequently, after time t4, the controller 125 is allowed to increase the engine speed (and vehicle speed) as required by the input signal from the user input device 116.

A third graph is shown in FIG. 9 illustrating a third example of the operation of the controller 125 during the method blocks 502 to 505 of FIG. 5, in response to receiving an input signal from a system controller 115, such as an ECU arranged to control battery recharging. A first line 901 represents the expected engine speed given the current speed of the vehicle 103 and the currently selected gear. A second line 902 represents the engine speed, for example as measured by the sensor 118 on the output shaft 105 of the engine 102. A third line 903 represents the target engine speed value provided by the TCM 126 to the controller 125.

In this example, in a first period 904, the engine 102 is stopped and therefore line 902 shows that the engine speed is zero. Line 901 shows that the expected engine speed is positive because the vehicle is moving. The line 903 is zero because no reconnection of the engine 102 to the driveshaft 104 is taking place in the first period 904. At the end of the first period 904, at time t1, an input signal from a system controller 115, such as an ECU arranged to control battery recharging, is received resulting in the target engine speed value (line 903) increasing to a new value. In a second period 905, following time t1, the target engine speed value (line 903) is set to be equal to the expected engine speed (line 901).

During the second period 905, the engine 102 is started and therefore the engine speed (line 902) increases. At time t2, when the engine 102 starts, a third period 906 begins in which the engine speed (line 902) increases towards the target engine speed (line 903). In the present example, the engine speed (line 902) is caused by the controller 125 to increase more rapidly than in previous examples and allowed to overshoot the target engine speed (line 903). However, the engine speed is then reduced so that it becomes equal to the target engine speed (line 903) before, at time t3, a fourth period 907 begins in which the clutch mechanism 106 is reengaged to reconnect the engine 102 to the driveshaft 104.

Allowing the engine speed (line 902) to overshoot the target engine speed (line 903) may also be allowed when the engine restart is caused by an input signal received from an input device 116. This may allow the engine speed to attain the target engine speed more quickly, which may be required for example to cause a rapid acceleration of the vehicle 103. However, the engine speed is controlled to bring it down to be no greater than the target engine speed before the reconnection of the engine 102 to the driveshaft 104 begins.

In the fourth period 907 of the graph of FIG. 9, the engine speed (line 902) is maintained equal to the expected engine speed (line 901) and consequently as the reconnection takes place, no acceleration is experienced by the occupants of the vehicle 103.

The fourth period ends at time t4 at which time reconnection of the engine 102 to the driveshaft 104 is complete, the TCM 126 sets the target engine speed to zero indicating that control of engine speed for the reconnection is no longer required, and a further signal may be provided by the TCM 126 to the controller 125 confirming that the clutch mechanism 106 is engaged.

In a fifth period 908 following completion of reconnection at time t4, the engine speed may be controlled by user inputs received by input devices 116.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

The blocks illustrated in the FIGS. 2, 3, 5 and 6 may represent steps in a method and/or sections of code in the computer program 1004. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature and/or combination of features hereinbefore referred to and/or shown in the drawings whether or not particular emphasis has been placed thereon.

The invention claimed is:

1. A controller comprising:
  an electronic processor having an electrical input for receiving at least one input signal and a further signal; and
  an electronic memory device electrically coupled to the electronic processor and having instructions stored therein, wherein the instructions are configured to cause the electronic processor to:
  cause stopping of power generation of an engine during movement of a vehicle in dependence on at least one criterion being met;
  cause restarting of power generation by the engine, in dependence on the at least one input signal indicating a requirement for the engine to restart to provide a required power output;
  receive a target engine speed value dependent on a current driveshaft speed;
  cause the engine to maintain an engine speed that is no greater than a target engine speed during a period after receiving the at least one input signal and until the further signal is received indicating that a reconnection of the engine to a driveshaft has been established, the target engine speed being dependent on said target engine speed value; and
  allow the engine speed to exceed the target engine speed after receiving the further signal,
  wherein, in dependence on the driveshaft speed being at or below a threshold value, the controller is configured to determine the target engine speed dependent on an idle speed of the engine.

2. A controller according to claim 1, wherein the target engine speed is within a predefined speed of the idle speed of the engine.

3. A controller according to claim 1, wherein the controller is configured to allow the engine speed to rise above the target engine speed and fall to the target engine speed before reconnection of the engine to the driveshaft.

4. A controller according to claim 1, wherein the target engine speed is independent of the required power output indicated by the at least one input signal.

5. A controller according to claim 1, wherein the target engine speed value depends on the current driveshaft speed and a ratio of a gear to be engaged.

6. A controller according to claim 1, wherein the controller is configured to determine the target engine speed from the target engine speed value and a ratio of a gear to be engaged.

7. A controller according to claim 1, wherein
  an expected engine speed is derivable from a ratio of a gear to be engaged and a speed of the vehicle or the current driveshaft speed; and
  the target engine speed is arranged to be within a predefined difference of the expected engine speed.

8. A controller according to claim 7, wherein the predefined difference comprises a difference of between 0 and 60 revolutions per minute.

9. A controller according to claim 1, wherein the controller is configured to continually receive signals from a transmission control module, the signals comprising the target engine speed value dependent on the current driveshaft speed, the transmission control module being configured to cause the reconnection of the engine to the driveshaft when the engine speed is at, or below, the target engine speed.

10. A controller according to claim 1, wherein the at least one input signal indicating a requirement for the engine to restart to provide a required power output is generated in response to a user input.

11. A controller according to claim 1, wherein the at least one input signal indicating a requirement for the engine to restart to provide a required power output indicates a brake pressure has been reduced below a threshold value.

12. A controller according to claim 1, wherein the at least one input signal indicating a requirement for the engine to restart to provide a required power output indicates a user request for acceleration of the vehicle.

13. A controller according to claim 1, wherein the at least one input signal indicating a requirement for the engine to restart to provide a required power output indicates a user request for a change of gear.

14. A controller according to claim 1, wherein the controller is configured to cause restarting of power generation by the engine and, before the reconnection of the engine to the driveshaft, increase the engine speed at a rate that depends upon the at least one input signal.

15. A controller according to claim 1, wherein the at least one input signal indicating a requirement for the engine to restart comprises a request for power from a system controller of a system of the vehicle that requires power to perform a function.

16. A control system for controlling an engine of a vehicle and for controlling connection and disconnection of the engine and a driveshaft, the control system comprising a controller and a transmission control module that provides signals to the controller, the control system being configured to:
   enable disconnection of the engine from the driveshaft and stop power generation of the engine during movement of the vehicle; and
   in dependence on at least one input indicating a requirement for the engine to restart to provide a required power output, cause restarting of power generation by the engine and reconnection of the engine to the driveshaft,
   wherein the control system is configured to limit a speed of the engine to be no more than a target engine speed when reconnecting the engine to the driveshaft, and the target engine speed is dependent on a current driveshaft speed,
   wherein, in dependence on the driveshaft speed being at or below a threshold value, the control system is configured to determine the target engine speed dependent on an idle speed of the engine.

17. A control system according to claim 16, wherein the transmission control module is configured to continually provide the signals to the controller, said signals being dependent on the current driveshaft speed, and to cause reconnection of the engine to the driveshaft when the engine speed is at, or below, the target engine speed.

18. The vehicle including the control system of claim 16 and comprising a plurality of wheels that receive torque from the driveshaft.

19. A method of controlling an engine of a vehicle, the method comprising:
   causing stopping of power generation of the engine during movement of the vehicle in dependence on at least one criterion being met;
   causing restarting of power generation by the engine, in dependence on receiving at least one input signal indicating a requirement for the engine to restart to provide a required power output;
   receiving a target engine speed value that is dependent on a current driveshaft speed;
   causing the engine to maintain an engine speed that is no greater than a target engine speed during a period after receiving the at least one input signal and until a further signal is received indicating that a reconnection of the engine to a driveshaft has been established, the target engine speed being dependent on said target engine speed value; and
   allowing the engine speed to exceed the target engine speed after reconnection of the engine to the driveshaft,
   wherein, in dependence on the driveshaft speed being at or below a threshold value, the target engine speed is determined dependent on an idle speed of the engine.

* * * * *